United States Patent [19]

Mick

[11] 4,399,733
[45] Aug. 23, 1983

[54] SEMIAUTOMATIC SWAYBRACE

[75] Inventor: John C. Mick, Webster Groves, Mo.

[73] Assignee: The United States of America as represented by the Secretary of the Air Force, Washington, D.C.

[21] Appl. No.: 297,459

[22] Filed: Aug. 28, 1981

[51] Int. Cl.³ .............................................. F41F 5/02
[52] U.S. Cl. ................................. 89/1.5 B; 244/137 R
[58] Field of Search ............... 89/1.5 B, 1.5 G, 1.5 H; 244/137 R; 411/1, 6

[56] References Cited

U.S. PATENT DOCUMENTS

| | | | |
|---|---|---|---|
| 2,526,903 | 10/1950 | Ruppert | 89/1.5 B |
| 2,549,785 | 4/1951 | Douglass | 89/1.5 B X |
| 3,670,620 | 6/1972 | Paraskewik | 89/1.5 B |
| 3,854,681 | 12/1974 | Hasquenoph et al. | 244/118 R |
| 3,967,528 | 7/1976 | Baker | 89/1.5 B |
| 4,233,883 | 11/1980 | Miko | 89/1.5 B |
| 4,346,642 | 8/1982 | Uhle | 89/1.5 B |

FOREIGN PATENT DOCUMENTS

| | | | |
|---|---|---|---|
| 108532 | 8/1917 | United Kingdom | 411/6 |
| 577186 | 5/1946 | United Kingdom | 89/1 B |
| 578931 | 7/1946 | United Kingdom | 89/1 B |

*Primary Examiner*—David H. Brown
*Attorney, Agent, or Firm*—Donald J. Singer; Bobby D. Scearce

[57] ABSTRACT

A novel semiautomatic swaybrace is provided for steadying and restraining bombs or the like suspended from the bomb racks of aircraft. The swaybrace of this invention comprises a spiral wedge and torsion/compression spring uniquely configured to allow the swaybrace to be cocked to a retracted condition prior to loading of a bomb rack and then to be released to automatically and firmly seat itself against the load. The interaction of the forces stored in the compressed spring with the spiral wedge allow automatic extension of the swaybrace.

3 Claims, 2 Drawing Figures

SEMIAUTOMATIC SWAYBRACE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of suspension devices configured to support bombs carried by aircraft. More specifically, this invention relates to swaybrace assemblies for steadying and restraining bombs or similar loads suspended from racks on aircraft.

Swaybrace devices are used in suspension racks for bombs and the like on aircraft to steady and to restrain a bomb or similar load from shifting, swaying or otherwise moving from the stored position in the bomb rack during flight maneuvers of the aircraft.

Experience on some existing fighter aircraft have shown that it is extremely time consuming to load weapons onto a multiple carriage bomb rack. Each bomb is restrained against sway at several contact points using swaybrace devices, and a large portion of the time spent in loading a bomb rack is spent in manually adjusting swaybrace bolts with the load in place in the rack such that access to the swaybrace bolts is severely restricted.

Representative prior art swaybrace devices are such as U.S. Pat. No. 3,670,620 to Paraskewik which discloses a swaybrace device comprising paired sets of scissored swaybraces restrained by clamps mounted on a threaded shaft. U.S. Pat. No. 3,967,528 to Baker discloses a device comprising two cantilevered swaybrace arms, each having two oppositely placed sway bolts.

Existing assemblies for swaybracing loads installed in bomb racks on aircraft suffer certain disadvantages including the necessity to adjust the force and position of the swaybraces after the bomb is installed onto the bomb rack, or the swaybrace devices may provide excessive load on the bomb rack load suspension system.

These and other disadvantages in prior art devices have been overcome or significantly reduced in critical importance by the present invention providing a semiautomatic swaybrace which may be adjusted and locked into a spring loaded retracted position prior to loading of the bomb rack when access to the rack is clear. Once the load is installed onto the bomb rack, the latch restraining the semiautomatic swaybrace in the retracted position may be released to allow the swaybrace to seat and center itself firmly against the load in the bomb rack. The novel swaybrace of the present invention may be configured to be compatible with existing bomb suspension systems without affecting design of the associated release mechanisms.

It is, therefore, an object of this invention to provide a semiautomatic swaybrace for steadying and restraining loads carried on an aircraft bomb rack.

It is a further object of this invention to provide a semiautomatic swaybrace which may be adjusted prior to loading of the rack and which may then seat and center itself against the load.

These and other objects of the invention will become apparent as the detailed description thereof proceeds.

SUMMARY OF THE INVENTION

In accordance with the foregoing principles and objects of the present invention, a novel semiautomatic swaybrace is provided for steadying and restraining bombs or the like suspended from the bomb racks of aircraft. The swaybrace of this invention comprises a spiral wedge and torsion/compression spring uniquely configured to allow the swaybrace to be cocked to a retracted condition prior to loading of a bomb rack and then to be released to automatically and firmly seat itself against the load. The interaction of the forces stored in the compressed spring with the spiral wedge allow automatic extension of the swaybrace.

DESCRIPTION OF THE DRAWINGS

The invention will be more clearly understood from the following detailed description of specific embodiments thereof read in conjunction with the accompanying drawings wherein.

DETAILED DESCRIPTION

Figure 1:
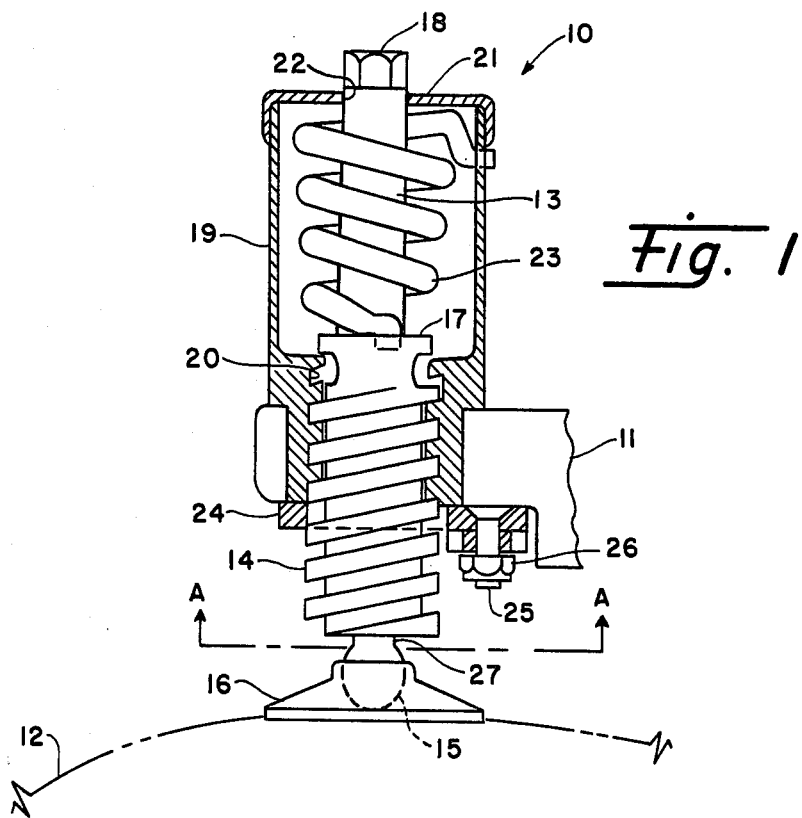
FIG. 1 is a side elevational view in partial section of one embodiment of the novel swaybrace of this invention.

Referring now to the drawings, FIG. 1 shows a schematic partial cutaway drawing of one embodiment of the swaybrace 10 of the present invention. Swaybrace 10 may be supported conventionally by the aircraft's bomb rack through such as arm 11 (shown in cutaway in FIG. 1) in such manner to brace a load such as bomb 12 (shown partially in phantom). Bomb 12 may be suspended conventionally from a hook (not shown) comprising a part of a multiple carriage bomb rack and bomb release mechanism of an aircraft.

Figure 2:
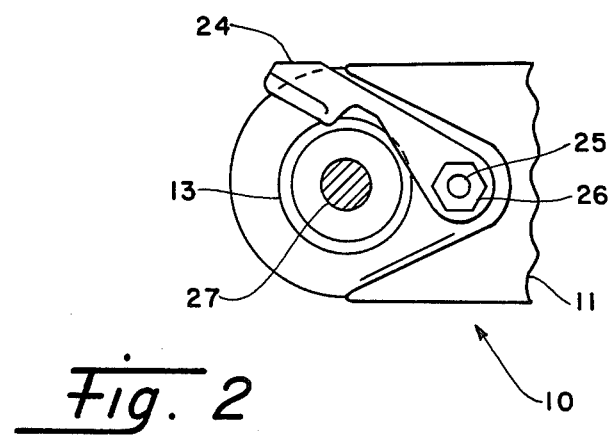
FIG. 2 is a view of the bottom of the swaybrace of FIG. 1 as taken along line A—A of FIG. 1.

In the embodiment as shown in FIG. 1 and FIG. 2, swaybrace 10 may comprise a rod or stud 13 having external machined threads in the form of a spiral wedge 14 on one portion thereof. Stud 13 terminates at one end with a ball 15 which is received by a conical bracing pad 16 for contacting the load, bomb 12. Stud 13 has near its center a shoulder 17, above which stud 13 has a reduced diameter terminating in a wrench head 18.

Stud 13 is received by a cylindrically-shaped housing or sleeve 19 having internal machined threads 20 near one end thereof slideably receiving spiral wedge 14. At the other end, sleeve 19 may have external threads for receiving retaining cap 21, having hole 22 through which the wrench head 18 of stud 13 protrudes. A compression/torsion spring such as helical spring 23 is positioned concentrically around stud 13 within sleeve 19 as shown in FIG. 1. Spring 23 is retained within sleeve 19 by retaining cap 21 and may bear against shoulder 17 of stud 13.

Referring now additionally to FIG. 2, which is a view of swaybrace 10 of FIG. 1 taken along line A—A, a latch 24 is mounted near stud 13, pivots about threaded pin 25 and is secured by nut 26. Latch 24 is generally flat with an indentation on one side to engage that portion 27 of stud 13 near ball 15 when the swaybrace 10 is in the fully retracted condition against the compressive force of spring 23 as explained more fully hereinbelow.

The swaybrace 10 of FIG. 1 is shown in its extended condition with bracing pad 16 in contact with bomb 12. Swaybrace 10 may be retracted as to prepare for loading of a bomb rack by rotating stud 13 counterclockwise to retract spiral wedge 14 into sleeve 19 against the torsion and compression forces of spring 23. In the embodiment of FIGS. 1 and 2, swaybrace 10 may be retracted or cocked by rotating stud 13 counterclockwise using a wrench on wrench head 18 and simultaneously applying had pressure against bracing pad 16. Once stud 13 is in its fully retracted condition, latch 24 may be pivoted to engage portion 27 and interfere with axial movement of stud 13 to prevent stud 13 from extending while the bomb rack is being loaded. Once the bomb rack is loaded, and the load, bomb 12, is positioned for bracing, latch 24 may be manually rotated away from engagement with stud 13. The torsion and compression forces of spring 23, bearing on shoulder 17 of stud 13 then cause stud 13 to rotate clockwise and extend itself until bracing pad 16 is seated against the load, such as shown in the configuration of FIG. 1.

It should be noted that, as stud 13 of swaybrace 10 extends itself by reason of the interaction of the forces stored in torsion/compression spring 23 with spiral wedge 14, bracing pad 16 will be seated firmly and automatically against bomb 12 without manual adjustments.

The present invention, as hereinabove described, therefore provides a novel semiautomatic swaybrace for restraining and steadying loads suspended from aircraft, such as bombs installed in bomb racks of aircraft.

It is understood that the configuration of the present invention and its component parts may be varied, within the scope of the appended claims, as might occur to one with skill in the field of this invention. Therefore, all embodiments contemplated hereunder have not been shown in complete detail. Other embodiments may be developed without departing from the spirit of this invention or from the scope of the appended claims.

I claim:

1. A swaybrace for steadying a load suspended from an aircraft, comprising:
   a. a threaded rod;
   b. a sleeve, supported by said aircraft, having threads on an inwardly disposed surface thereof, for receiving and supporting said threaded rod for rotation about its axis; and
   c. torsional spring means, supported by said sleeve, and engaging said rod, for simultaneously rotating and axially extending said rod along said threads into contact with said load.

2. The swaybrace as recited in claim 1 further comprising a bracing pad attached to said rod at the end thereof contacting said load.

3. The swaybrace as recited in claim 1 or claim 2 further comprising releasable latching means for holding said rod in a retracted position within said sleeve against the force of said spring means.

* * * * *